Patented Jan. 25, 1938

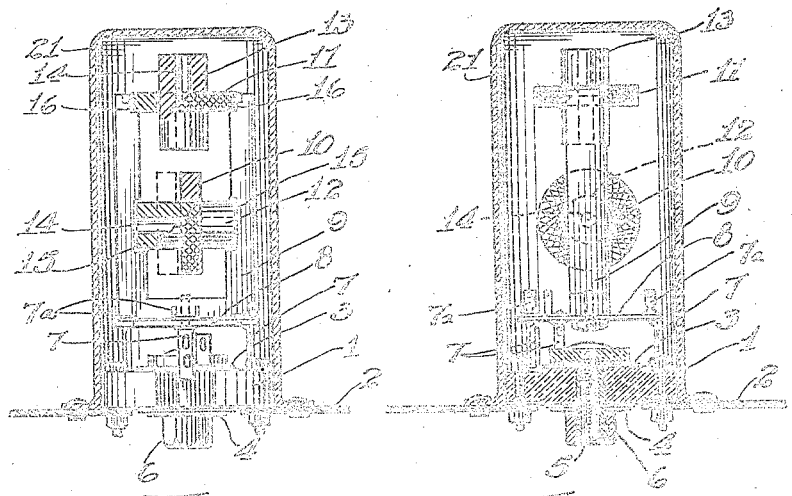
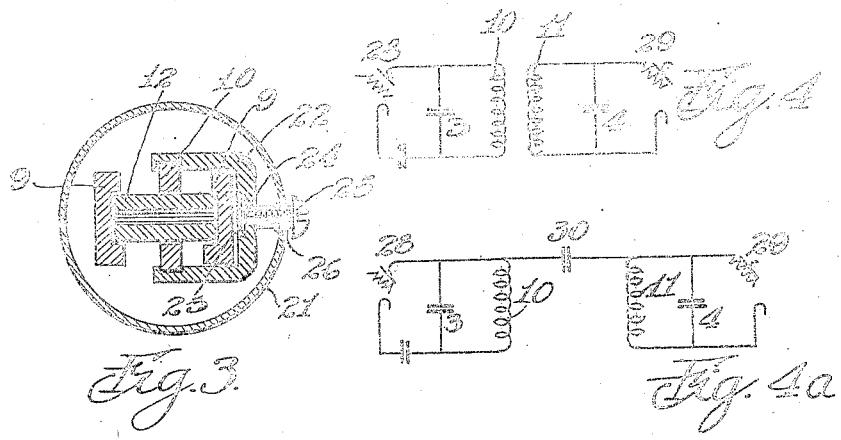

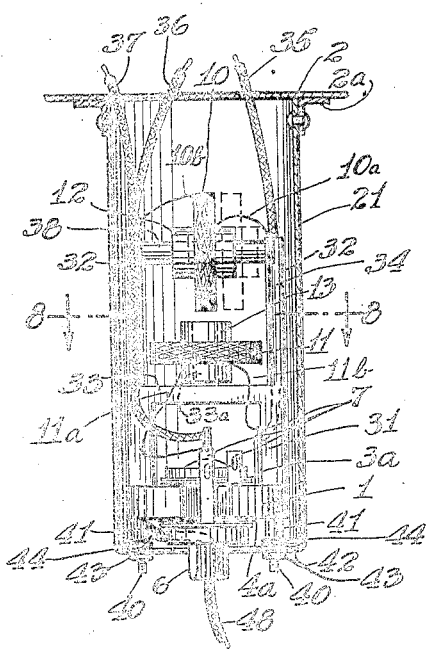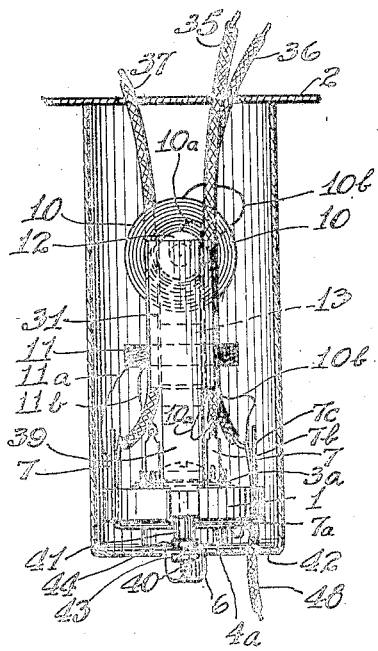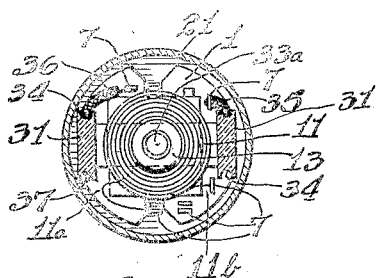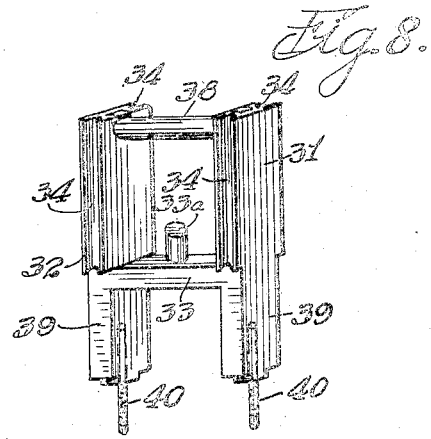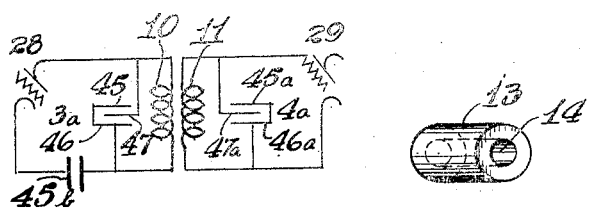

2,106,253

UNITED STATES PATENT OFFICE 2,106,253

INTERMEDIATE-FREQUENCY COUPLING DEVICE

Charles C. Neighbors and Herbert E. Meinema, Chicago, Ill., assignors to Johnson Laboratories, Inc., Chicago, Ill., a corporation of Illinois Application November 11, 1933, Serial No. 697,551

9 Claims. (Cl. 178—44)

The invention relates broadly to improvements in high-frequency amplifying systems, and more particularly to systems designed to be operated at a fixed frequency, such for example as those in the intermediate-frequency amplifiers of superheterodyne radio receivers. Such systems, in general, include, in addition to the amplifying thermionic relay, a resonant system consisting of two inductance coils and their tuning condensers, the coils being arranged either in magnetic relation or else capacitively coupled to each other. The condensers are normally of a type having very low losses, and include means for a small adjustment of their capacitances. The efficiency of the complete design depends to a very large extent upon the inductance coils.

An object of this invention is to provide a novel type of coils and coupling means for use in such amplifying systems, which, because of its design, will greatly increase the efficiency of the system. Additionally, it is the object of this invention to provide designs for the resonant circuits of such amplifying systems which will be more compact, and which can be easily adjusted to the desired coupling.

Further objects of the invention are attained by the employment of cylindrical and preferably hollow magnetic cores for the inductance coils in order that when one of these coils is adjusted relatively to the other, minimum or negligible, or, if desired, maximum or optimum values of coupling may be readily secured.

The hollow cores also provide a more economical form than solid cores, and incidentally afford means for their ideal mounting, so that great ease of adjustment is obtained when making required coupling adjustments.

Still a further object of the invention is attained by so fashioning the insulating frame or support on which the inductance coils and their cores are mounted, that it will constitute a single and integral entity embodying all of the features which are essential to admit of the mounting of the cores and their coils thereon as well as to enable the frame or support to be itself mounted on an adjacent part of the structure. Furthermore, the frame may include elements for accurately holding the leads in predetermined relative positions in order that the spacing of the leads will be definitely established.

Circuits of the class here contemplated normally occur in pairs, one resonant circuit being connected to the output terminals of a first thermionic relay, and another circuit being connected to the input terminals of a second thermionic relay.

In order that a current flowing in the first resonant circuit may induce a voltage in the second, the coils are normally coupled inductively. The coil in the circuit connected to the output terminals of the first thermionic relay is usually called the first winding, and the coil in the circuit connected to the input terminals of the second thermionic relay is usually called the second winding. In some instances, however, these designations may be reversed, and either of the thermionic relays may in certain types of apparatus be arranged so that it does not operate strictly as an amplifier. These variations, however, are not material with respect to the application and scope of the present invention.

In present-day designs, coupling devices of the class here under consideration normally have air cores. Across the first coil, and also across the second coil, there is connected a condenser the capacitance of which is adjustable over a limited range. By suitably designing the first and second windings and by adjustment of the associated condensers, each of the circuits may be tuned to be resonant at the desired frequency. In order to effect a maximum transfer between the first and second windings, it is essential that the inductive coupling between the two windings shall be closely of the optimum value. In present designs, it is normal to establish the degree of coupling in the design of the coupling device, so that when the coils are assembled the proper coupling will exist.

Because of the losses which normally exist in air-core coils of the type now commonly used, it is not essential to provide means for adjusting the coupling between the first and second coils after the unit is assembled. It is usually sufficient to determine experimentally what physical relation between the two coils will give approximately the correct coupling and then to mechanically design the coupling device so as to produce this relation.

In the designs herein described, the losses in the coils themselves are greatly decreased, and it therefore becomes desirable to provide means for accurately adjusting each coupling device to the desired coupling between the first and second windings. The present invention, therefore, includes designs for inductance coils having greatly increased efficiency, and arrangements whereby two such coils may be inductively related in a coupling device with means for producing an accurate adjustment of the inductive coupling between the windings or introducing sufficient inductive coupling to counteract a certain capacitive coupling.

It is also possible to provide an adjustment, as hereinafter explained, whereby the inductive coupling adds to the capacitive coupling.

The increased efficiency of the coils themselves is secured by introducing a ferromagnetic core. These cores are preferably of a type made by compressing individually insulated magnetic particles of very small size. The size of the particles which will be most advantageous for use in any particular design will depend largely upon the frequency for which the system is being designed. In general, the higher the frequency, the smaller the particles will be. The insulation of the individual particles must be sufficiently complete to produce a very high electrical resistivity in the compressed core, which will then have very low electrical losses.

In cores of this preferred type, it is readily possible to secure effective permeability of the order of from 2 to 4. This greatly decreases the size of the coil itself, because fewer turns are required for any desired value of inductance. This materially decreases the resistance of the winding. Since the losses in the air-core coils of present designs are the chief source of inefficiency, a reduction in the size of the coils will produce a proportionate decrease in the losses of the system, provided that the losses introduced by the introduction of the ferromagnetic cores are sufficiently small. Cores of the type which we have described possess this property of extremely low losses, so that the iron-core coils are very much more efficient than the equivalent air-core coils.

Because of the higher efficiency of the iron-core coils, it is possible to obtain the necessary transfer with less coupling than is permissible with air-core coils. This results in an increase in the electrical efficiency of the coupling device. In a high-frequency amplifier, for example, it is possible to get substantially twice the amplification while maintaining the selectivity the same as it would be with air-core coils, or, if desired, it is possible to obtain approximately twice the selectivity while maintaining the same amplification. Similarly, a fifty per cent increase in both amplification and selectivity can be secured.

The invention will be better understood by reference to the accompanying drawings, which are illustrative of practicable mechanical embodiments of the invention and show, additionally, minor improvements and variations which may be desirable in certain cases. It will be readily understood by those skilled in the art that numerous mechanical arrangements may be employed to mount the coils upon their ferromagnetic cores, and to provide means for mechanical adjustments to vary the inductive coupling between the first and second windings, all within the scope of the present invention.

Referring to the drawings,

Figure 1 is an elevation partly in section, of a high-frequency coupling device employing ferromagnetic core bodies;

Figure 2 is an elevation, partly in section, of the coupling device of Figure 1, but taken in a direction at right angles to the view shown in Figure 1;

Figure 3 is a detail, in section, of one of the core and coil combinations of Figures 1 and 2, showing an arrangement for adjusting the position of the coil without removing the external shield from the coupling device;

Figures 4 and 4A present simplified schematic wiring diagrams which are illustrative of two methods of employing the coupling devices of this invention in the circuits of a high-frequency amplifier;

Figure 5 presents a view, in elevation and partly in section, showing a modification of the device shown in Figure 1;

Figure 6 presents a similar view taken at right angles to the view presented in Figure 5;

Figure 7 presents a horizontal sectional view taken on the line 7—7 of Figure 5;

Figure 8 presents a view of a modification of the supporting frame for the elements of the coupling device;

Figure 9 presents a schematic wiring diagram of the coupling device and the tuning condensers associated with two thermionic relays; and Figure 10 presents a view of the tubular or hollow core shown in other figures.

Referring to Figure 1, the coupling device here illustrated consists of an insulating base 1, preferably of a ceramic material. The base 1 is designed to be conveniently secured to the chassis 2 upon which the other portions of the complete apparatus are mounted. Secured to the base 1 are condensers 3 and 4 which are so designed as to be adjustable, in their capacitances, over a limited range. As illustrated in Figure 2, the capacitance of the condenser 3 is adjusted by means of the screw 5 and the capacitance of the condenser 4 is adjusted by means of the nut 6.

The terminals 7 of the condensers 3, 4 rise from the ceramic base 1 and are secured at their upper ends to a small disc 8 of insulating material which serves as a support for the coupling device proper. Ears, 7a, are eyeleted through the base 8 to the terminals 7 of the condensers 3, 4, to provide points at which connections from the coils of the coupling device may be made. Rising from the disc 8 is a support 9, of insulating material, for the cores and coils of the coupling device. The member 9 may be molded to have the desired shape or may be produced by any other suitable process.

The coils 10 and 11 constitute the first and second windings of the coupling device. Depending upon other conditions of the design, it may be convenient to make either of the coils 10 and 11 the first winding. The coils themselves are preferably of the type produced on a universal winding machine and are designed to have a desirable relation of length to depth of winding. In the majority of designs the two coils will be similar, although in some instances it may be desirable to have one coil with a greater number of turns than the other.

The coils 10, 11 have ferromagnetic cores 12, 13, which as illustrated in Figures 1 and 2 are cylindrical, and may, in some embodiments of the invention, be solid or may have a central hole 14 throughout their length, as shown. After being finally adjusted, the coil 10 is securely cemented to the core 12 and the coil 11 is securely cemented to the core 13. The core 12 is cemented into seats 15 in the insulating support 9. Similarly, the coil 11 is cemented into properly shaped seats 16 at the top of the insulating support 9.

It will be observed that the coils 10, 11 are mutually at right angles and that the cores 12, 13 are also mutually at right angles. It will be clear that by positioning the coil 10 at what may be designated as the magnetic center of the magnetic system comprising the cores 12, 13 and the coils 10 and 11, there will be no inductive coupling whatever between the coils 10 and 11, or at least only a very small degree of coupling. However, by shifting the coil 10 longitudinally along its core 12, a degree of coupling of a substantial order and adequate for the purpose of the design can be secured. The advantage of the arrangement lies in the fact that it is possible to quickly obtain in production any desirable degree of coupling with only a small movement of the coil on the core. A possible adjusted position of the coil 10 is indicated by the dotted outline in Figure 1. After the coil 10 has been adjusted to the position producing the desired degree of coupling, it is securely cemented in place.

The cores 12 and 13 in Figure 1 are shown with holes 14 through their centers. These holes are advantageous in certain designs, because cores with holes require a smaller amount of the ferromagnetic material for a given inductance value, and because such cores concentrate the magnetic flux nearer to the coil windings.

Referring again to Figures 1 and 2, the assembly includes a metal shield 21 which is usually desirable in order to prevent inductive and capacitive coupling between adjacent coupling devices. The shield 21 may be arranged to be eyeletted to the chassis 2 as shown, or may be arranged for frictional engagement with the insulating base 1.

In order to provide means for adjusting the coil 10 longitudinally of its core 12 with the shield 21 in place, there is shown in Figure 3 an alternative arrangement in which a U-shaped insulating bracket 22 is cemented to the coil 10 at its periphery. Secured to the bracket 22 by means of the washer 23, but free to turn in a hole 24 therein, is a screw 25, which engages a thread 26 in the wall of the shield 21. When the screw 25 is turned the coil 10 is adjusted along the core 12 to produce the desired coupling.

Figure 4 shows a coupling device of the type herein contemplated, connected between two thermionic relays. The coil 10 is connected in parallel with the condenser 3 to form a resonant circuit in the anode circuit of the thermionic relay 28. The coil 11 is connected in parallel with the condenser 4 to form a resonant circuit in the grid circuit of the thermionic relay 29. Either of the thermionic relays 28, 29 may, in certain arrangements, be a detector or a modulating or demodulating device.

In Figure 4 the coupling between the coils 10 and 11 is adjusted by the method described in connection with Figures 1, 2 and 3. Normally, it will be desirable to adjust the coupling to a value slightly below the optimum, although in certain instances it may be beneficial to adjust the coupling exactly to the optimum value or to slightly over-couple the coils 10 and 11. In either case the coupling adjustment is readily accomplished by the means shown, and the circuits 3—10 and 4—11 are adjusted for resonance at the same frequency by adjustment of the condensers 3, 4.

Figure 4A is in all respects similar to Figure 4, except that here the coupling between the resonant circuits 3—10 and 4—11 is capacitive and is accomplished by the condenser 30. In this arrangement the coil 10, Figure 1, or alternatively the coil 11 and the core 13, Figure 2, will be adjusted for zero inductive coupling, this adjustment being readily accomplished by any suitable means. The capacitive coupling may consist of the coupling between coils, leads or terminals, or a suitable condenser in addition to the capacitive coupling previously referred to, may be employed.

It is clear from the above that, if desired, a combination of inductive and capacitive coupling may be secured through the use of a condenser 30 and an adjustment of the coil 10 or the coil 11 and core 13 so as to produce the desired coupling.

The construction shown in Figures 5 to 9, inclusive, is alternative to and embodies details of construction which are not included in the device as shown in Figures 1 to 4, inclusive.

In the embodiment of the invention shown in Figures 5 to 9, inclusive, the adjustable coil 10 and its core 12 are situated proximate the upper end of the shield 21 to which brackets 2a are attached, one object of this disposition of the adjustable core being to reduce the losses produced by the metal shield when the coil 11 is disposed proximate the closed end thereof, as shown in Figures 1 and 2. Another reason for disposing the adjustable coil 10 proximate the open end of the shield 21 is to render it readily accessible in order that it may be adjusted before the chassis 2 has closed the open end.

Another feature of the invention, as shown in said Figures 5 to 9, inclusive, is the preferable support or frame 31 which carries the coils 10 and 11 and their respective cores 12 and 13. This support or frame is preferably made of a molded insulating material such as for instance bakelite, or it may be made of any other material preferably of a non-conducting nature and is preferably produced in a single piece in order to avoid the cost of assembling operations which would be necessary if it included, as it might, a plurality of elements.

This support or frame 31 comprises parallel and fixed side bars 32 which, preferably, are united by a cross bar 33, and are provided with grooves 34 in certain of which the plate lead 35, the B-voltage lead 36, and the ground lead 37, may rest. The terminal 10a of the coil 10 also is laid in one of the grooves and is connected to the ear 7b. The terminal 10b is connected to the ear 7c. The terminals of the lower coil 11 go directly to the ears 7 and 7a. The grid lead 48 connects with the ear 7a and then is brought out of the end of the shield 21. These leads and terminals may be secured in the grooves by any suitable cementitious substance or held in fixed relation to the support or frame by any other means which will adequately and securely hold them in place, so long as their relative and essential positions are maintained.

The cross bar 33 sustains the coil 11, and may be provided with a preferably integral fixed stud 33a, extending into and preferably cemented to the cylindrical core 13 of the coil 11.

The support or frame 31 carries a wooden or molded guide rod 38, freely extending through the cylindrical core 12 of the coil 10, to thereby permit the coil 10 and its core 12 to be moved relatively to the center of the magnetic system. This adjustment of the coil 10 and its core 12 might, however, be attained if the guide rod 38 were longitudinally movable and the coil and core were fixed thereto.

Each of the side bars 32 of the support or frame 31 carries at its lower end 39 a threaded mounting stud 40 which extends through the insulating base 1, a spacing sleeve 41, and the bottom 42 of the shield 21, the threaded portions of the studs 40 being provided with nuts 43 bearing against the under side of the bottom 42 so as to securely lock the support or frame to the shield 21. The threaded portions of the studs 40 also are provided with nuts 44 which secure the sleeves 41 in position while the support or frame 31 is still unattached to the shield 21.

The insulating base 1 carries two condensers 3a and 4a, indicated in the schematic diagram of Figure 9, each having a capacitance adjustable over a limited range. One of these condensers, 3a, is disposed above, and the other, 4a, is disposed below the insulating base 1.

These condensers 3a, 4a are respectively provided with upper and lower grounded plates 45, 45a and 46, 46a, between which are respectively disposed third plates 47, 47a. The third plates 47 and 47a are connected with the high-potential sides of their respective coils. The single high-potential plates 47 and 47a are placed between the low-potential plates 45 and 46 and 45a and 46a, respectively, which act as shields for the high-potential plates, thus desirably and materially reducing the influence of stray fields on the coupling of the device. A condenser 45b is employed as a by-pass for high-frequency voltage across the B-voltage source.

Having described the details of construction of the type of transformer shown in Figures 5 to 9, inclusive, an explanation of the electrical characteristics of the device may now be made.

The first requirement is to reduce to a definite amount the capacitive coupling, and this is done by placing leads and terminals in fixed relation to each other, as already described, and by having the high-potential plate of each tuning condenser shielded by the two low-potential plates of that condenser. With this disposition of the parts and the previously described shielding, the capacitive coupling is fixed and of low value, and if sufficient opposing inductive coupling is introduced, the coupling due to the capacitive component can be neutralized, and any further increase in this inductive coupling will maintain it as a pure inductive coupling. Conversely, if an inductive coupling which aids the capacitive coupling is employed, an increased coupling effect is produced.

It will be found, however, that movement of the movable core and its coil to either side of the center of the magnetic system will vary the output or coupling, because on one side of that center (which side being determined by the relative direction of the windings) the voltage induced in the second winding due to inductive coupling is aiding the secondary voltage due to the fixed capacitive coupling, while on the other side of center it is bucking or counteracting it. This important feature admits of any degree of coupling from zero to practically maximum coupling, and, in the higher frequency coupling devices, it is possible to obtain over-coupling. This fact has been easily demonstrated in the case of coupling devices operating at 456 kilocycles and employing coils having an inductance of one millihenry each, and also in other coupling devices operating at much lower frequencies. It will be noted, therefore, that moving the coil 10 from one side of the vertical axis to the other side reverses the instantaneous magnetic polarity of the core 13. Obviously the coil and core may be moved as a unit, or the coil alone can be adjusted to secure this result.

The maintenance of fixed capacitive coupling insures the uniform performance of similar coupling devices. If the high-potential part of the condenser were not shielded and the positions of the leads and the terminals were not fixed, it would be impossible to duplicate results and, in a goodly number of cases, over-coupling would occur which would render the coupling devices unusable. Due to the fact that two variable couplings had to be adjusted, an enormous amount of time would be absorbed in making and trying out adjustments. By fixing the capacitive coupling there is only one coupling, namely the inductive coupling, which is adjustable. After this adjustment has been made any means for fixing the core and coil unit in its adjusted position, as for instance by cement, may be utilized to make the relationship permanent.

The coil form shown in the drawings, being narrow in width, occupies a small space on the core, but this coil can be made wider for the lower frequency units. This coil can be made of litzendraht wire or of solid wire, depending upon the frequency of the coupling device. For a coupling device operating in the range including 456 kilocycles, a narrow universally wound coil having approximately 250 turns of 7/41 litzendraht wire is preferably employed. A coil for coupling devices, operating in the range including 262 kilocycles is preferably universally wound with approximately 400 turns of 3/40 litzendraht wire.

A coil for a coupling device operating in the range including 175 kilocycles is preferably universally wound with approximately 550 turns of 3/40 litzendraht wire. Coils to be used in coupling devices operating at frequencies lower than 175 kilocycles are, preferably, of a universal-type winding, and may be wound with a solid insulated wire. It is, of course, understood that a solid insulated wire may be used at any given frequency, but at a sacrifice in quality of performance.

The table given below shows performance data for iron-core high-frequency coupling devices in accordance with the present invention, as compared with that of the best air-core devices of types commercially available at the present time. In this table the term "Figure of Merit" indicates the relative merit of all types of coupling devices, and is obtained by multiplying the gain by the selectivity ratio. This represents an equitable method for determining relative performance.

| Shield diameter | Gain or amplification | Selectivity ratio 10 kilocycles off resonance | Frequency | Figure of merit | Comments |
| --- | --- | --- | --- | --- | --- |
| 1½″ | 200 | 6.3 | 456 | 1260 | Air-core |
| 1½″ | 299 | 14.55 | 456 | 4350 | Iron-core |
| 2″ | 303 | 22.92 | 175 | 6930 | Air-core |
| 2″ | 385 | 45.25 | 175 | 17400 | Iron-core |
| 1½″ | 180 | 16.39 | 262 | 2950 | Air-core |
| 1½″ | 257 | 28.0 | 262 | 7200 | Iron-core |

It is also a fact that with this invention the diameter and material of the shield has a very definite effect on the performance of the device. A change in diameter from 1½ to 2¾ inches approximately doubles the efficiency, while if copper is substituted for aluminum in the shield, an increase of ten per cent is obtained for a given shield diameter.

The core employed is made of finely divided magnetic material, as for instance iron reduced by hydrogen, the particles of which are individually insulated and bound together by a binder under pressure. The insulation of the particles is essential in order that eddy-current losses will be a minimum.

A preferred form of the core is tubular because it has been found that a twenty-eight per cent reduction in cubical content due to the hole in the center produces less than ten per cent reduction in the inductance of the tubular coil compared with a solid core of identical external dimensions, with practically no loss in efficiency. Aside from the saving in material the hole in the core also provides a convenient means for mounting.

Having thus described our invention, what we now claim is:

1. A coupling device including a first winding and a second winding and a ferromagnetic core for each of said windings and a condenser connected across each of said windings, at least one of said condensers being adjustable, said coupling device and said condensers forming a pair of adjustably resonant and adjustably coupled resonant circuits, a condenser for capacitively coupling one of said resonant circuits to the other of said resonant circuits and means whereby the inductive coupling between said circuits may be adjusted from a value substantially equal to zero to a value greater than the critical value by linear movement of one of said windings relative to the other of said windings.

2. A high-frequency coupling device including a first inductor and a second inductor, each of said inductors comprising a winding and an open-type comminuted ferromagnetic core coaxial therewith, the axis of said first inductor intersecting the axis of said second inductor at right angles at the magnetic center of the core thereof to secure substantially zero inductive coupling between said inductors, a condenser connected in shunt with each of said windings, at least one of said condensers being adjustable, and means for axial adjustment of the winding of said second inductor whereby optimum coupling between said inductors may be secured, said inductors and said condensers forming a pair of adjustably resonant and adjustably coupled circuits.

3. A high-frequency coupling device including a first inductor and a second inductor, each of said inductors comprising a winding and an open-type comminuted ferromagnetic core coaxial therewith, the axis of said first inductor intersecting the axis of said second inductor at right angles at the magnetic center of the core thereof to secure substantially zero inductive coupling between said inductors, a condenser connected in shunt with each of said windings, at least one of said condensers being adjustable, means for axial adjustment of the winding of said second inductor whereby optimum coupling between said inductors may be secured, and a conductive shield enclosing said inductors and said condensers and having an aperture to permit adjustment of said second inductor, said inductors and said condensers forming a shielded pair of adjustably resonant and adjustably coupled circuits.

4. A high-frequency coupling device including unitary first and second windings disposed with their axes intersecting at right angles, one of said windings being axially adjustable to vary the inductive coupling between said windings, each winding having a ferromagnetic core, said cores being in spaced relation, and a condenser connected in shunt with each of said windings, at least one of said condensers being adjustable.

5. In a band-pass filter, a coupling device including a first winding and a second winding, a cylindrical compressed comminuted ferromagnetic core for each of said windings, said cores being in spaced relation with their axes intersecting at right angles, and means for axial adjustment of the position of one of said windings relative to the other of said windings to secure a desired degree of inductive coupling between said windings.

6. In a band-pass filter, a high-frequency coupling device including unitary first and second windings, a ferromagnetic core for each of said windings, said cores being in spaced relation and disposed at right angles to each other and having a relative position of zero inductive coupling, and means for sliding one complete winding to either side of said position of zero inductive coupling.

7. In a band-pass filter, a high-frequency coupling device including a first inductor and a second inductor, each of said inductors comprising a winding and an open-type comminuted magnetic core coaxial therewith, the axis of said first inductor intersecting the axis of said second inductor at right angles, and means for relative axial adjustment of said second inductor to secure a desired degree of inductive coupling between said inductors.

8. In a band-pass filter, a high-frequency coupling device including a first inductor and a second inductor, each of said inductors comprising a winding and an open-type comminuted magnetic core coaxial therewith, the axis of said first inductor intersecting the axis of said second inductor at right angles at the magnetic center of the core thereof, and means for relative axial adjustment of said second inductor to secure a desired degree of inductive coupling between said inductors.

9. In a band-pass filter, a high-frequency coupling device including a first inductor and a second inductor, each of said inductors comprising a winding and an open-type comminuted magnetic core coaxial therewith, the axis of said first inductor intersecting the axis of said second inductor at right angles at the magnetic center of the core thereof, and means for relative axial adjustment of the winding of said second inductor to secure a desired degree of inductive coupling between said inductors.

CHARLES C. NEIGHBORS.
HERBERT E. MEINEMA.